(12) United States Patent
Liu et al.

(10) Patent No.: US 10,915,472 B2
(45) Date of Patent: Feb. 9, 2021

(54) COMPUTER SYSTEM WITH PROGRAMMABLE SERIAL PRESENCE DETECTION DATA AND MEMORY MODULE CONTROL METHOD

(71) Applicant: Shanghai Zhaoxin Semiconductor Co., Ltd., Shanghai (CN)

(72) Inventors: Jing Long Liu, Beijing (CN); Fei Duan, Beijing (CN); Li Ge, Beijing (CN); Dong Bo Zhang, Beijing (CN)

(73) Assignee: SHANGHAI ZHAOXIN SEMICONDUCTOR CO., LTD., Shanghai (CN)

(*) Notice: Subject to any disclaimer, the term of this patent is extended or adjusted under 35 U.S.C. 154(b) by 0 days.

(21) Appl. No.: 16/600,706

(22) Filed: Oct. 14, 2019

(65) Prior Publication Data
US 2021/0004336 A1 Jan. 7, 2021

(30) Foreign Application Priority Data
Jul. 3, 2019 (CN) .......................... 2019 1 0593290

(51) Int. Cl.
*G06F 13/16* (2006.01)
*G06F 8/65* (2018.01)
*G06F 9/4401* (2018.01)
*G06F 13/42* (2006.01)

(52) U.S. Cl.
CPC ............ *G06F 13/1668* (2013.01); *G06F 8/65* (2013.01); *G06F 9/4411* (2013.01); *G06F 13/4282* (2013.01)

(58) Field of Classification Search
CPC combination set(s) only.
See application file for complete search history.

(56) References Cited

U.S. PATENT DOCUMENTS

| 6,625,692 | B1* | 9/2003 | Stubbs | G06F 12/0684 710/13 |
|---|---|---|---|---|
| 7,318,151 | B1* | 1/2008 | Harris | G06F 21/572 713/100 |
| 8,429,643 | B2* | 4/2013 | Venkatachalam | G06F 8/65 717/173 |
| 8,490,081 | B2* | 7/2013 | Moon | G06F 8/65 717/174 |
| 9,519,786 | B1* | 12/2016 | Laredo | G06F 8/654 |
| 2006/0004978 | A1* | 1/2006 | Nakayama | G06F 9/4411 711/170 |
| 2006/0143600 | A1* | 6/2006 | Cottrell | G06F 21/572 717/168 |
| 2006/0174109 | A1* | 8/2006 | Flynn | G06F 12/1408 713/164 |

(Continued)

*Primary Examiner* — Raymond N Phan
(74) *Attorney, Agent, or Firm* — McClure, Qualey & Rodack, LLP (57) ABSTRACT

A computer system with programmable serial presence detection (SPD) data is disclosed. The computer system uses a user-programmable memory to store virtual SPD data which includes the configuration information of the memory module. The virtual SPD data is stored separately from the system boot code of the computer system. A computing unit uses a memory driver to drive the memory module. The memory driver accesses the user-programmable memory through a virtual SPD module to acquire the configuration information of the memory module.

18 Claims, 7 Drawing Sheets

(56) References Cited

U.S. PATENT DOCUMENTS

| | | | |
|---|---|---|---|
| 2008/0162867 A1* | 7/2008 | Shin | G06F 9/4401 |
| | | | 711/173 |
| 2009/0037900 A1* | 2/2009 | von Khurja | G06F 8/654 |
| | | | 717/173 |
| 2012/0191964 A1* | 7/2012 | Lee | G06F 11/2289 |
| | | | 713/2 |

* cited by examiner

| 31 | 0 | |
|---|---|---|
| signature ('V', 'S', 'P' or 'D') | | 00h |
| header size | | 04h |
| a total virtual SPD region size Virtual_SPD_R# | | 08h |
| the number of SPD blocks | | 0Ch |
| a CRC32 value of the SPD block | | 10h |
| a reserved area | | 1Ch |

COMPUTER SYSTEM WITH PROGRAMMABLE SERIAL PRESENCE DETECTION DATA AND MEMORY MODULE CONTROL METHOD

CROSS REFERENCE TO RELATED APPLICATIONS

This Application claims priority of China Patent Application No. 201910593290.8, filed on Jul. 3, 2019, the entirety of which is incorporated by reference herein.

BACKGROUND OF THE INVENTION

Field of the Invention

The present invention relates to serial presence detection (SPD) of a memory module of a computer system, and particularly relates to acquisition and update of the SPD data.

Description of the Related Art

Serial presence detection (SPD) is a standardized way to acquire configuration information about a memory module. Using a dynamic random access memory (DRAM) as an example, the SPD data includes the number of banks of the DRAM, the operating voltage, the addressing size of rows/columns, the bit width, the operation timing, and so on. Generally, 256 or even 512 bytes of storage space is required.

A conventional DRAM memory module has an electrically-erasable programmable read-only memory (EEPROM). According to the memory model type number, the memory manufacturer programs the corresponding SPD data into the EEPROM. The DRAM driver acquires the SPD data from the EEPROM, and thereby uses precise configuration information to configure the memory module. The memory module, therefore, is operated at its highest efficiency.

However, SPD data may need an update. When the SPD data is programmed in the EEPROM of a memory stick, the memory stick needs to be recalled to the factory for an update of the SPD data.

BRIEF SUMMARY OF THE INVENTION

The present invention proposes a flexible way to manage serial presence detection (SPD) data of a memory module. The SPD data is not limited to being stored in an EEPROM. In this disclosure, the SPD data is stored in a user-programmable memory as virtual SPD data so that it is updatable. A virtual SPD module is proposed to acquire the virtual SPD data. The virtual SPD data is stored separately from the system boot code (e.g., BIOS code, UEFI code, or EFI code). When updating the SPD data, no changes are required to the system boot code. The system boot code is not modified when the SPD data is updated in the user-programmable memory.

A computer system with programmable SPD data in accordance with an exemplary embodiment of the present invention has a memory module, a user-programmable memory; and a computing unit. The user-programmable memory stores virtual SPD data which includes the configuration information of the memory module. The virtual SPD data is stored separately from the system boot code of the computer system. The computing unit uses a memory driver to drive the memory module. The memory driver accesses the user-programmable memory through a virtual SPD module to acquire the configuration information of the memory module.

The virtual SPD data is updated without modifying the system boot code.

In an exemplary embodiment, the computer system further has a storage device, which is an update source of SPD data. By using a tool provided in a system booting environment, a new version of SPD data is read from the storage device and loaded to the user-programmable memory to update the virtual SPD data.

In an exemplary embodiment, a new version of SPD data is downloaded from the Internet by the computer system. When the computer system is rebooted, the new version of SPD data that has been downloaded in the computer system is loaded to the user-programmable memory to update the virtual SPD data.

In an exemplary embodiment, the memory module is an on-board die soldered on a motherboard of the computer system.

In an exemplary embodiment, the virtual SPD data includes multiple sets of SPD data corresponding to multiple memory modules of different models.

In an exemplary embodiment, the virtual SPD data includes a header and a plurality of data blocks. Each data block corresponds to the memory module of one model and stores the identification code and configuration information of the memory module of the model.

In an exemplary embodiment, multiple sectors of the user-programmable memory are allocated for the storage of the virtual SPD data. The virtual SPD data are backup in the different sectors.

In an exemplary embodiment, the virtual SPD module uses a memory mapping input/output technique to get an address, and reads the user-programmable memory to acquire the virtual SPD data stored at the address.

In an exemplary embodiment, the system boot code is stored in the user-programmable memory.

In an exemplary embodiment, the virtual SPD module is coded as one part of the system boot code.

In an exemplary embodiment, the memory module has an electrically-erasable programmable read-only memory (EEPROM) storing the identification code of the memory module. The memory driver accesses the EEPROM through a bus driver to read the identification code from the EEPROM. Through the virtual SPD module, the memory driver accesses the user-programmable memory according to the identification code to acquire the configuration information corresponding to the identification code for the memory module.

In an exemplary embodiment, the transfer rate of a bus coupled to the user-programmable memory is higher than the transfer rate of the bus coupled to the EEPROM. In an exemplary embodiment, the user-programmable memory is accessed through a serial peripheral interface (SPI) bus, and the EEPROM is accessed through a system management (SM) bus.

In an exemplary embodiment, the bus driver, the virtual SPD module and the memory driver are all coded in the system boot code.

In an exemplary embodiment, the user-programmable memory is a special storage medium that is different from the memory in which the system boot code is stored. As requested by the memory driver, a driver of the special storage medium accesses the special storage medium through the virtual SPD module to read the virtual SPD data, and the memory driver thereby obtains the configuration information of the memory module.

In an exemplary embodiment, the special storage medium is a USB flash drive or a hard disk.

A memory module control method implemented in accordance with the above concept is also within the scope of the present invention. In an exemplary embodiment, a control method for a memory module includes the following steps: storing virtual SPD data in a user-programmable memory, wherein the virtual SPD data includes the configuration information of the memory module, and the virtual SPD data is stored separately from the system boot code of the computer system; and using a computing unit to execute a memory driver to drive the memory module, wherein the memory driver accesses the user-programmable memory through a virtual SPD module to acquire the configuration information of the memory module.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows exemplary embodiments for carrying out the invention. This description is made for the purpose of illustrating the general principles of the invention and should not be taken in a limiting sense. The scope of the invention is best determined by reference to the appended claims.

Figure 1:
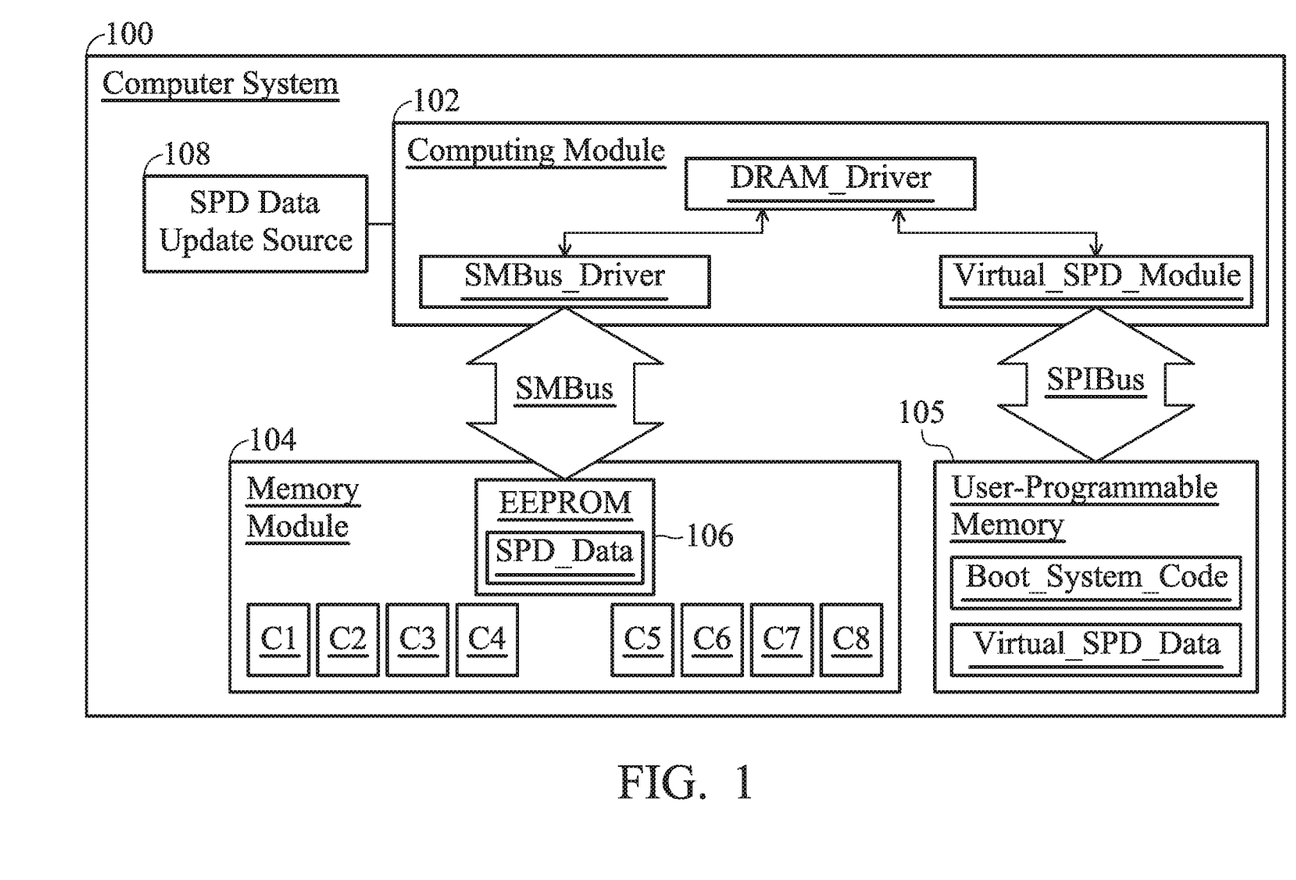
FIG. 1 depicts a computer system 100 in accordance with an exemplary embodiment of the present invention.

FIG. 1 depicts a computer system 100 in accordance with an exemplary embodiment of the present invention, which includes a computing unit 102, a memory module 104 and a user-programmable memory 105. In an exemplary embodiment, the user-programmable memory 105 is an SPI (serial peripheral interface) memory, e.g., an SPI ROM. The user-programmable memory stores virtual serial present detection (SPD) data Virtial_SPD_Data.

In an exemplary embodiment, the computing unit 102 includes a plurality of computing components, such as a central processing unit (CPU), a chipset, etc.

In addition to chips C1 to C8 packing DRAM dies, the memory module 104 has an electrically-erasable programmable read-only memory (EEPROM) 106. Serial presence detection data SPD_Data is stored in the EEPROM 106, which includes configuration information regarding the DRAM chips C1 . . . C8 of the memory module 104, such as the number of banks, operating voltage, addressing size of the rows/columns, bit width, operation timing (sequence), etc. Specifically, identification code SPD_ID corresponding to the set of configuration information is recorded in the SPD data SPD_Data. The SPD data SPD_Data is usually 256 or even 512 bytes.

Because the EEPROM 106 on the memory module 104 needs to be recalled to the original factory for SPD data updating, the user-programmable memory 105 is used in the present invention to store and manage the SPD data. Note that the SPD data in the user-programmable memory 105 is stored separately from the system boot code Boot_System_Code. When the computer system 100 is powered on, the system boot code Boot_System_Code is executed to boot the computer system 100. The system boot code Boot_System_Code may be basic input/output system (BIOS) code, unified extendable firmware interface (UEFI) code, or extensible firmware Interface (EFI) code.

Referring to FIG. 1, the user-programmable memory 105 stores the system boot code Boot_System_Code (for example, BIOS/UEFI/EFI code) and virtual SPD data Virtual_SPD_Data. The virtual SPD data Virtual_SPD_Data is a substitute for the SPD data SPD_Data stored in the EEPROM 106, and the storage of the virtual SPD data Virtual_SPD_Data is independent of the storage of the system boot code Boot_System_Code. Compared with the SPD data SPD_Data on the EEPROM 106, the virtual SPD data Virtual_SPD_Data stored in the user-programmable memory 105 is easy to update. In particular, the virtual SPD data Virtual_SPD_Data and the system boot code Boot_System_Code are independently managed in the user-programmable memory 105. When updating the virtual SPD data Virtual_SPD_Data, no modification of the system boot code Boot_System_Code is required.

When the computer system 100 is powered on, the system boot code Boot_System_Code retrieved from the user-programmable memory 105 is executed. The following uses UEFI code as an example of the system boot code Boot_System_Code. By executing the UEFI code, four phases are introduced, including: an SEC phase, a PEI phase, a DXE phase, and a BDS phase. In the PEI phase, the central processing unit (CPU) of the computing unit 102 operates in a 32-bit protected mode and starts the initialization of the hardware chips. In the DXE phase, the CPU operates in a 64-bit protected mode (longer than the PEI phase), the driver programs of all hardware chips are loaded, and the initialization procedure is completed. The present invention may be used in the PEI phase to correctly fetch the initialization parameters of hardware chips.

In detail, the EEPROM 106 of FIG. 1 may be coupled to the computing unit 102 via a system management bus SMBus and the user-programmable memory 105 may be coupled to the computing unit 102 via a serial peripheral interface bus SPIBus, but it is not limited thereto. Other types of bus may be used. For example, an inter-integrated circuit bus (I2C) or the like may be used. In the PEI phase of UEFI, the DRAM driver DRAM_Driver is running, and a bus driver SMBus_Driver for the system management bus SMBus is established. In an exemplary embodiment, the bus driver SMBus_Driver establishes a PEIM-to-PEIM interface (PPI), where PEIM is an abbreviation of Pre-EFI Initialization Module and EFI is an abbreviation of Extensible Firmware Interface. The DRAM driver DRAM_Driver uses the system management bus driver SMBus_Driver to access the EEPROM 106 of the memory module 104, and the identification code SPD_ID of the configuration information contained in the SPD data SPD_data can thereby be acquired. The configuration information contained in the SPD data SPD_Data stored in the EEPROM 106, however, may be the older version. The actual accessing target should be the virtual SPD data Virtual_SPD_Data stored in the user-programmable memory 105.

In an exemplary embodiment, the DRAM driver DRAM_Driver and the system management bus driver SMBus_Driver may be coded as a part of the system boot code Boot_System_Code (e.g., BIOS/UEFI/EFI code). The source code of the DRAM driver DRAM_Driver and the system management bus driver SMBus_Driver are embedded in the system boot code Boot_System_Code before being executed by the computing unit 102.

In the present invention, the central processing unit (CPU) of the computing unit 102 operates the virtual SPD module Virtual_SPD_Module based on a memory mapping input/output (MMIO) technique. The DRAM driver DRAM_Driver uses the virtual SPD module Virtual_SPD_Module to access the user-programmable memory 105 to acquire the virtual SPD data Virtual_SPD_Data through a physical interface (e.g., the SPI bus SPIBus shown in FIG. 1), which includes identification code SPD_ID and a set of configuration information (i.e., the latest version of configuration information of the chips C1 . . . C8).

As shown, the computer system 100 may include a particular hardware 108 (e.g., a USB flash drive, a hard disc or a remote server) as the update source of SPD data. PD data update.

In an exemplary embodiment, the developer may store the new version of SPD data in the SPD data update source 108 (for example, a USB flash drive or a hard disk). By using a tool provided in the system booting environment (for example, the Shell tool under the UEFI booting system), the new version of SPD data is written to the user-programmable memory 105, and the virtual SPD data Virtual_SPD_Data is updated.

In an exemplary embodiment, the update version of configuration information is downloaded at the user end by using the operating system to connect a remote server. In an exemplary embodiment, since the virtual SPD data Virtual_SPD_Data is stored in the user-programmable memory 105 as the system boot code Boot_System_Code, the way the computer system 100 updates the system boot code Boot_System_Code may be also used in updating the virtual SPD data Virtual_SPD_Data. A rebooting is required. The new version of SPD data downloaded from the update source 108 (e.g., a remote server) is loaded to the user-programmable memory 105 to update the virtual SPD data Virtual_SPD_Data.

Note that in the user-programmable memory 105 the virtual SPD data Virtual_SPD_Data update does not accompany any modification on the system boot code Boot_System_Code.

The virtual SPD module Virtual_SPD_Module is discussed in detail herein. In an exemplary embodiment, the virtual SPD module Virtual_SPD_Module is implemented by software, which may be called by the DRAM driver DRAM_Driver. The source code of the virtual SPD module Virtual_SPD_Module may be stored in the user-programmable memory 105 as one part of the system boot code Boot_System_Code (e.g., BIOS/UEFI/EFI code). The source code of the virtual SPD module Virtual_SPD_Module is embedded in the system boot code Boot_System_Code before being executed by the computing unit 102. When being called by the DRAM driver DRAM_Driver, the virtual SPD module Virtual_SPD_Module evaluates an address based on the memory mapping input/output (MMIO) technique, by which the CPU adds an offset address to a base address. Through the high speed SPI bus SPIBus (up to 48 megabytes (M) transfer rate), the CPU accesses the user-programmable memory 105 according to the evaluated address, and the configuration information for operating the chips C1 . . . C8 stored at the evaluated address are thereby obtained from the virtual SPD data Virtual_SPD_Data. In contrast with the high speed SPI bus SPIBus, the system management bus SMBus is a slow-speed bus (only a few tens of kilobytes), and requires a particular controller (e.g., an SM Bus controller). Reading the SDP data SPD_Data from the EEPROM 106, obviously, is far less efficient than reading the virtual SPD module Virtual_SPD_Module from the user-programmable memory 105, because the virtual SPD module Virtual_SPD_Module is directly executed by the CPU of the computing unit 102 without using an additional controller. Although capable of being embedded in the system boot code Boot_System_Code, the virtual SPD module Virtual_SPD_Module should not be interpreted as the general driver code for hardware. The virtual SPD module Virtual_SPD_Module accesses the user-programmable memory 105 by way of MMIO without using any driver program for the user-programmable memory 105.

In some examples, the version of the virtual SPD data Virtual_SPD_Data is the same as the version of the SPD data SPD_Data on the EEPROM 106. Even so, switching to the SPI bus SPIBus to acquire configuration information for chips C1 to C7 still benefits significantly from the high transfer rate of the SPI bus SPIBus. The boot time of the computer system 100 is significantly shortened.

Figure 2:
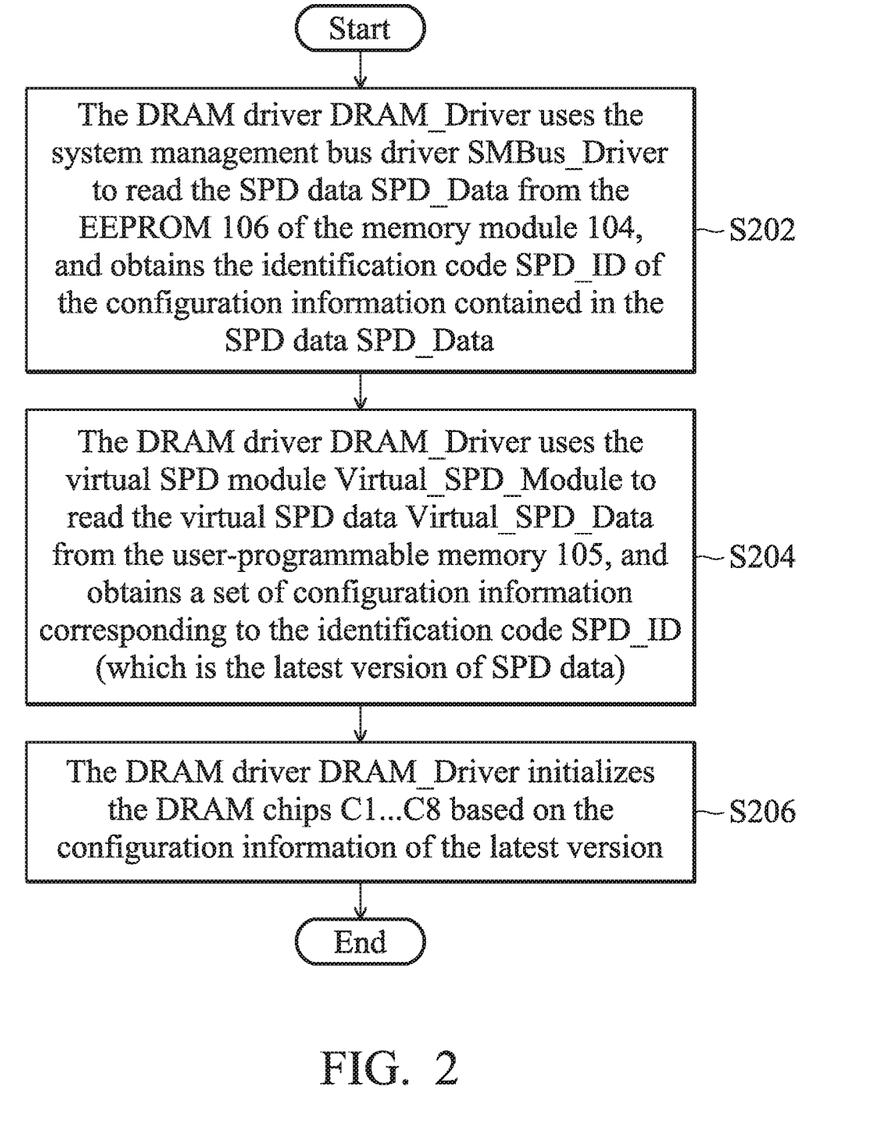
FIG. 2 is a flow chart illustrating how the DRAM driver DRAM_Driver performs the serial presence detection (SPD) on the DRAM chips C1 . . . C8 according to an exemplary embodiment of the present invention.

FIG. 2 is a flow chart illustrating how the DRAM driver DRAM_Driver performs the serial presence detection (SPD) on the DRAM chips C1 . . . C8 according to an exemplary embodiment of the present invention.

In step S202, the DRAM driver DRAM_Driver uses the system management bus driver SMBus_Driver to read the SPD data SPD_Data from the EEPROM 106 of the memory module 104, and obtains the identification code SPD_ID of the configuration information contained in the SPD data SPD_Data. In an exemplary embodiment, the reading step S202 is performed using a system management bus SMBus as shown in FIG. 1 as the physical interface, but it is not limited thereto.

In step S204, the DRAM driver DRAM_Driver uses the virtual SPD module Virtual_SPD_Module to read the virtual SPD data Virtual_SPD_Data from the user-programmable memory 105, and obtains a set of configuration information corresponding to the identification code SPD_ID (which is the latest version of SPD data). In an exemplary embodiment, the reading step S204 is performed using an SPI bus SPIBus as shown in FIG. 1 as the physical interface, but it is not limited thereto. Note that the physical interface (or bus) for acquiring the virtual SPD data Virtual_SPD_Data stored in the user-programmable memory 105 is at a higher transfer rate than the physical interface (or bus) for acquiring the SPD data SPD_Data stored in the EEPROM 106.

In step S206, the DRAM driver DRAM_Driver initializes the DRAM chips C1 . . . C8 based on the configuration information of the latest version. The serial presence detection (SPD) is completed.

Figure 3:
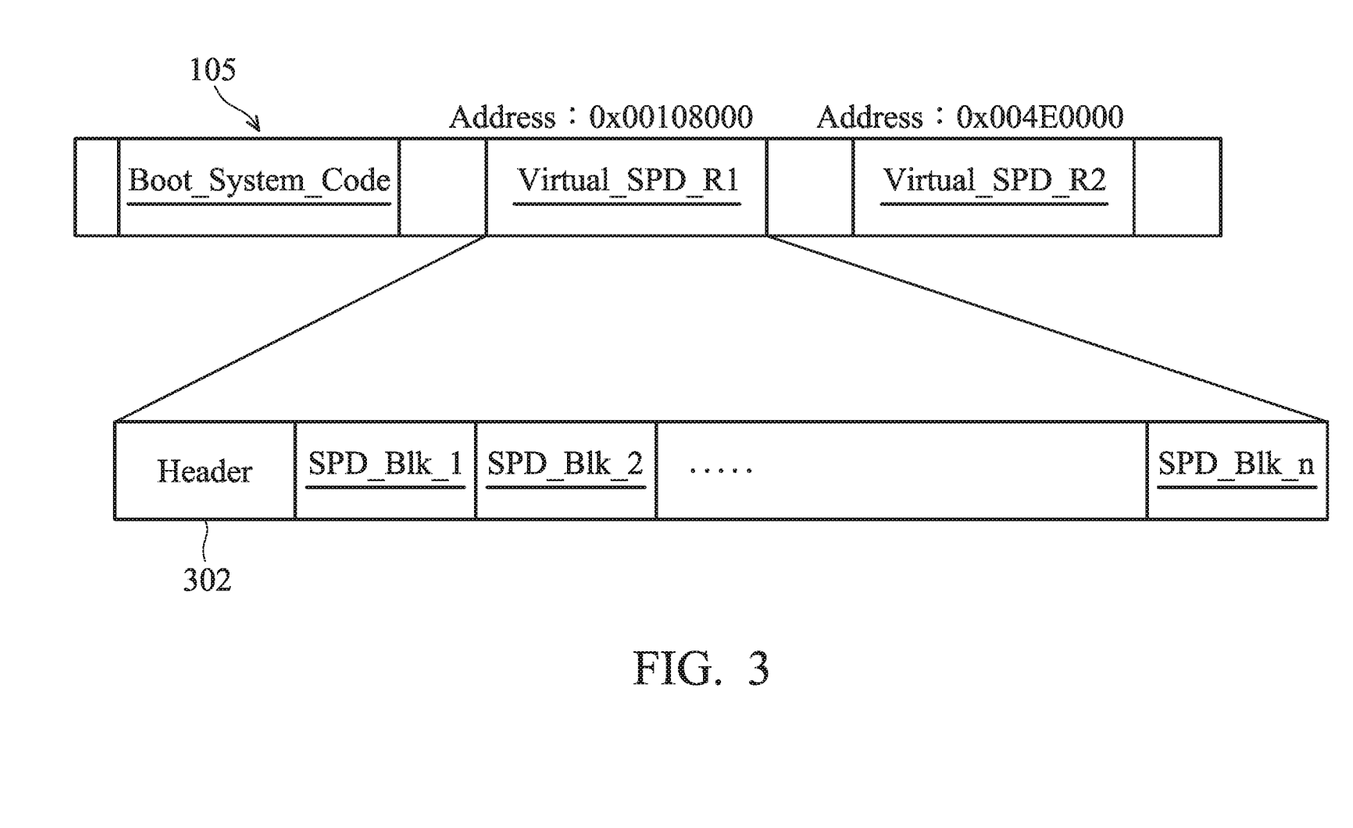
FIG. 3 illustrates the space allocation of the user-programmable memory 105 in accordance with an exemplary embodiment of the present invention.

FIG. 3 illustrates the space allocation of the user-programmable memory 105 in accordance with an exemplary embodiment of the present invention. The user-programmable memory 105 has ample space to store the virtual SPD data Virtual_SPD_Data even if the system boot code Boot_System_Code is stored. In the exemplary embodiment of FIG. 3, two sets of virtual SPD data Virtual_SPD_Data are stored in the two regions Virtual_SPD_R1 (at a start address, for example, 0x00108000) and Virtual_SPD_R2 (at a start address, for example, 0x004E0000). The data in the region Virtual_SPD_R1 and the data in the region Virtual_SPD_R2 are backups of each other.

Using region Virtual_SPD_R1 as an example, the stored virtual SPD data Virtua_SPD_Data includes: a header 302, and a plurality of SPD blocks SPD_Blk_1, SPD_Blk_2 . . . SPD_Blk_n. Each SPD data block corresponds to the memory module of one model, and has its own identification code SPD_ID. That is, each SPD data block stores the corresponding identification code SPD_ID and the configuration information regarding the corresponding model of the memory module. In this way, the virtual SPD data Virtual_SPD_Data stored in the user-programmable memory 105 can cope with various models of memory modules.

Figure 4A:
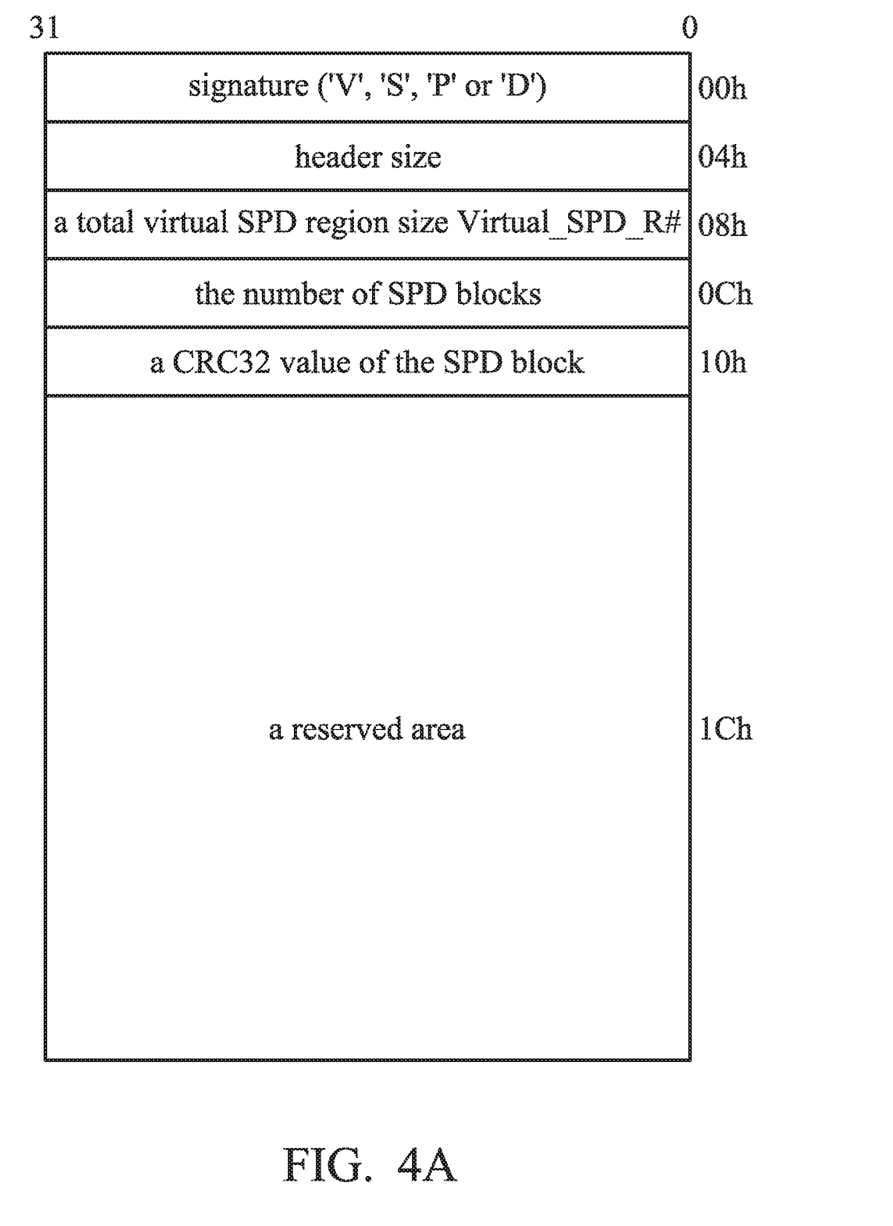
FIG. 4A illustrates a structure of the header 302 in accordance with an exemplary embodiment of the present invention.

FIG. 4A illustrates a structure of the header 302 in accordance with an exemplary embodiment of the present invention. The header 302 includes a signature ('V', 'S', 'P' or 'D'), a header size, a total virtual SPD region size Virtual_SPD_R # (# is the region number), the number of SPD blocks, a CRC32 value of the SPD block, and a reserved area.

Figure 4B:
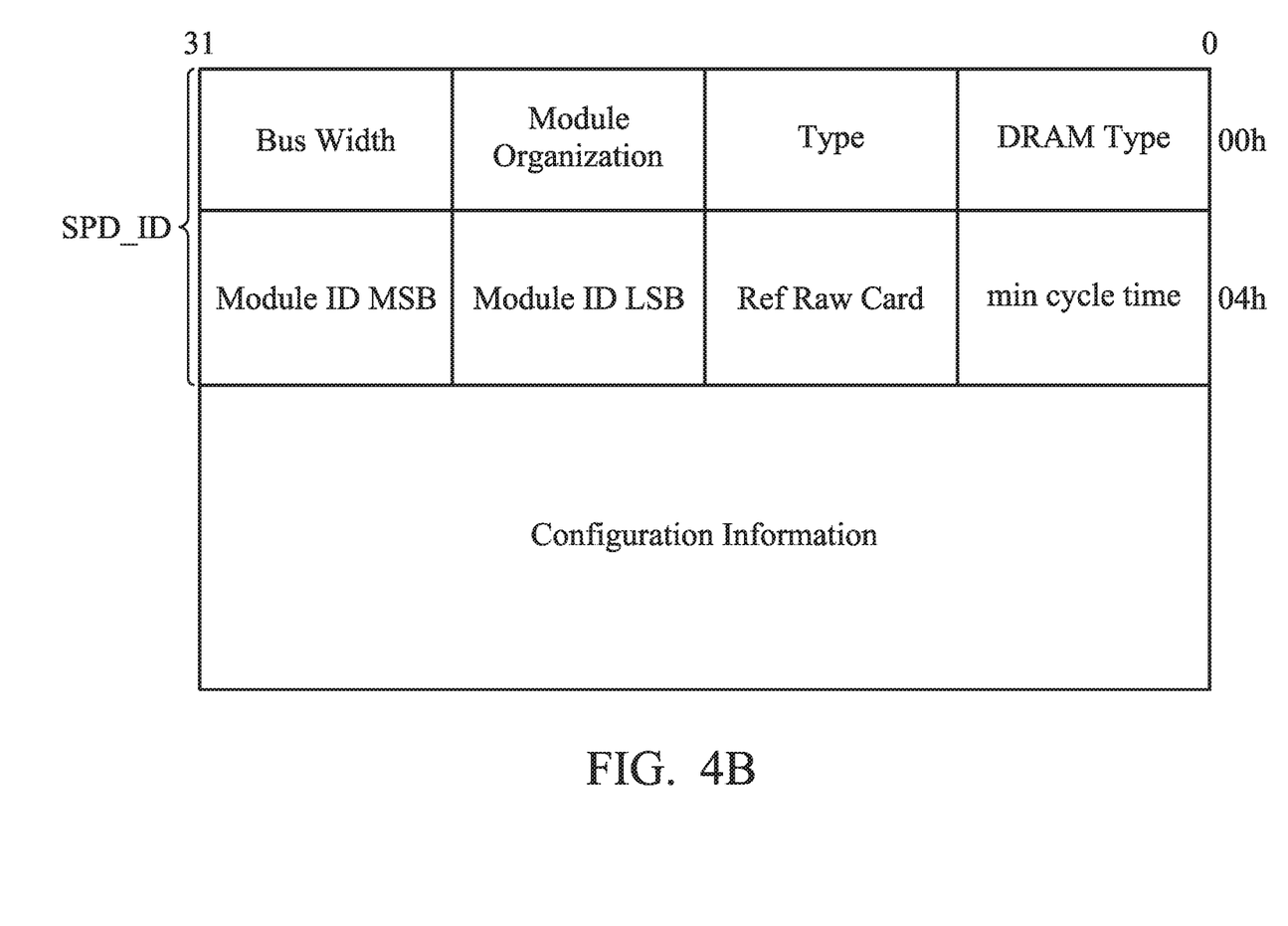
FIG. 4B illustrates a structure of an SPD data block in accordance with an exemplary embodiment of the present invention.

FIG. 4B illustrates a structure of an SPD data block in accordance with an exemplary embodiment of the present invention. The first eight bytes form the SPD identification code SPD_ID, including information of a bus width, module organization, module type, DRAM type, MSB of module ID, LSB of module ID, reference raw card, and minimum cycle time. The following 512 bytes are the configuration information to be detected as the SPD data, such as, the number of banks, operating voltage, addressing size of rows/columns, bit width, operation timing, etc.

Figure 5:
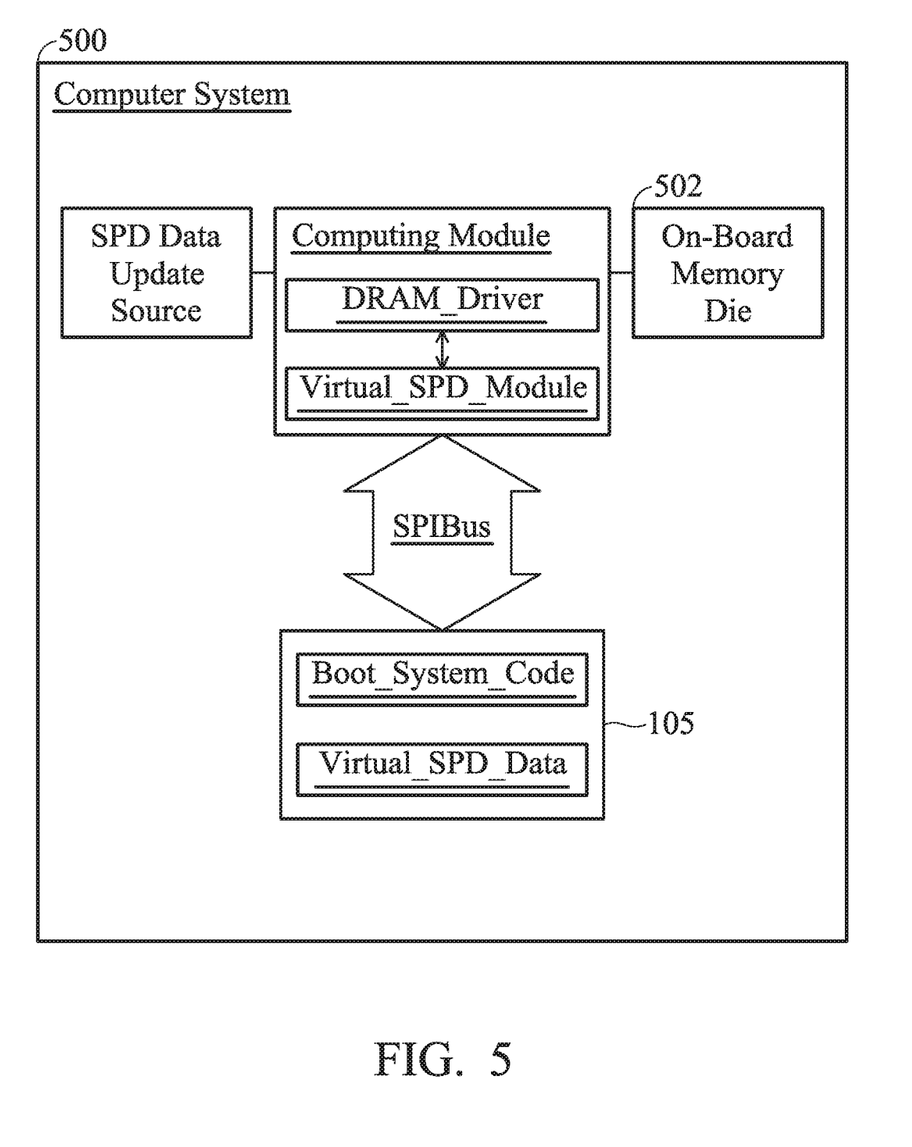
FIG. 5 illustrates a computer system 500 in accordance with an exemplary embodiment of the present invention, in which the memory module 104 of FIG. 1 is replaced with an on-board memory die 502.

Nowadays, there is a technology for directly soldering a memory die on the motherboard instead of packing the memory die as the memory module 104. FIG. 5 illustrates a computer system 500 in accordance with an exemplary embodiment of the present invention, in which the memory module 104 of FIG. 1 is replaced with an on-board memory die 502. The on-board memory die 502 is not a memory stick that implements the memory module 104. The on-board memory die 502 does not have the EEPROM 106 storing the SPD data SPD_Data. The SPD data SPD_Data is programmed in the user-programmable memory 105 as the virtual SPD data Virtual_SPD_Data, and is stored separately from the system boot code Boot_System_Code.

When booting the computer system 500, the system boot code Boot_System_Code in the user-programmable memory 105 is executed. The following discussion uses the extensible firmware interface UEFI as an example. In the PEI phase of the UEFI, the DRAM driver DRAM_Driver runs and, through the virtual SPD module Virtual_SPD_Module, the DRAM driver DRAM_Driver reads the virtual SPD data Virtual_SPD_Data from the user-programmable memory 105 via the SPI bus SPIBus. The configuration information regarding the on-board memory die 502 is acquired.

Figure 6:
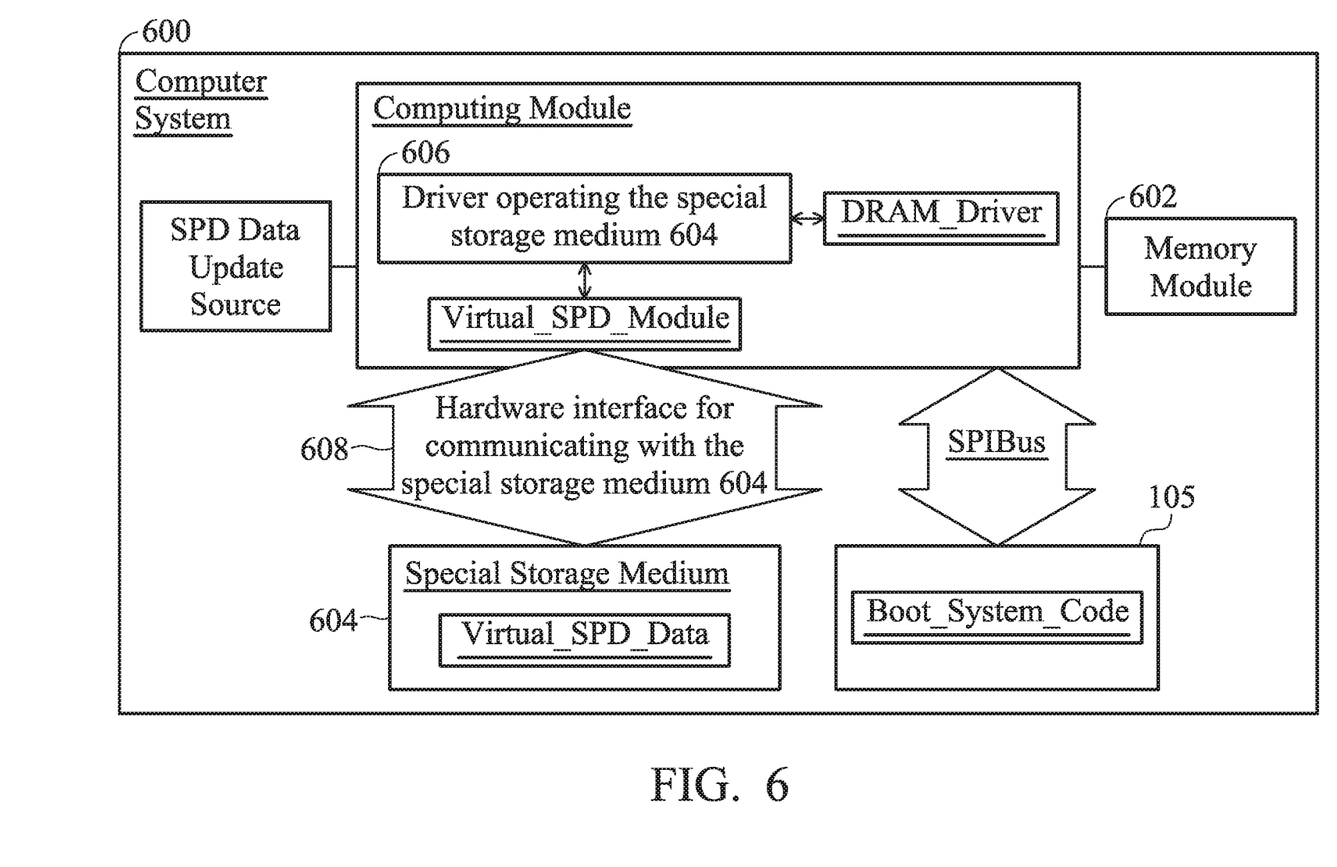
FIG. 6 illustrates a computer system 600 in accordance with an exemplary embodiment of the present invention.

The storage of the virtual SPD data Virtual_SPD_Data is not limited to the user-programmable memory 105. FIG. 6 illustrates a computer system 600 in accordance with an exemplary embodiment of the present invention. The configuration information of the memory module 602 (which may be a memory stick or an on-board memory die) may be stored in a special storage medium 604 as virtual SPD data Virtual_SPD_Data. The special storage medium 604 is not the user-programmable memory 105 storing the system boot code Boot_System_Code, neither the EEPROM 106 of the memory module 104 of FIG. 1. When booting the computer system 600, the system boot code Boot_System_Code in the user-programmable memory 105 is executed. The following discussion uses the extensible firmware interface UEFI as an example. The driver 606 for operating the special storage medium 604 (that may be coded in the system boot code Boot_System_Code) should be established earlier than the DRAM driver DRAM_Driver. As requested by the DRAM driver DRAM_Driver, the driver 606 for the special storage medium 604 calls the virtual SPD module Virtual_SPD_Module of the present invention to read the virtual SPD data Virtual_SPD_Data from the special storage medium 604 via a bus 608. The bus 608 is the hardware interface for communicating with the special storage medium 604. Accordingly, the configuration information of the memory module 602 is acquired.

In an exemplary embodiment, the special storage medium 604 is an I2C (Inter-Integrated Circuit) memory, e.g., an I2C ROM. The bus 608 may be an I2C bus.

In an exemplary embodiment, the special storage medium 604 is a USB flash drive. The bus 608 may be a universal serial bus (USB bus).

In an exemplary embodiment, the special storage medium 604 is a hard disk. The bus 608 adopts PCIe or SATA.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A computer system with programmable serial presence detection (SPD) data, comprising:
   a memory module;
   a user-programmable memory, storing virtual SPD data which includes configuration information for the memory module, wherein the virtual SPD data is stored separately from the system boot code of the computer system; and
   a computing unit, using a memory driver to drive the memory module,
   wherein:
   the memory driver accesses the user-programmable memory through a virtual SPD module to acquire the configuration information of the memory module, and the virtual SPD module uses a memory mapping input/output technique to get an address and reads the user-programmable memory to acquire the virtual SPD data stored at the address.

2. The computer system with programmable SPD data as claimed in claim 1, wherein:

the virtual SPD data is updated without modifying the system boot code.

3. The computer system with programmable SPD data as claimed in claim 1, further comprising:
a storage device, which is an SPD data source for SPD data updating,
wherein by using a tool provided in a system booting environment, a new version of SPD data is read from the storage device and loaded to the user-programmable memory to update the virtual SPD data.

4. The computer system with programmable SPD data as claimed in claim 1, wherein:
a new version of SPD data is downloaded from Internet by the computer system; and
when the computer system is rebooted, the new version of SPD data that has been downloaded in the computer system is loaded to the user-programmable memory to update the virtual SPD data.

5. The computer system with programmable SPD data as claimed in claim 1, wherein:
the memory module is an on-board die soldered on a motherboard of the computer system.

6. The computer system with programmable SPD data as claimed in claim 1, wherein:
the virtual SPD data includes multiple sets of SPD data corresponding to multiple memory modules of different models.

7. The computer system with programmable SPD data as claimed in claim 1, wherein:
the virtual SPD data includes a header and a plurality of data blocks; and
each data block corresponds to the memory module of one model and stores an identification code and configuration information of the memory module of the model.

8. The computer system with programmable SPD data as claimed in claim 1, wherein:
multiple sectors of the user-programmable memory are allocated for the storage of the virtual SPD data for backup of the virtual SPD data.

9. The computer system with programmable SPD data as claimed in claim 1, wherein:
the system boot code is stored in the user-programmable memory.

10. The computer system with programmable SPD data as claimed in claim 1, wherein:
the virtual SPD module is coded as one part of the system boot code.

11. The computer system with programmable SPD data as claimed in claim 1, wherein:
the memory module has an electrically-erasable programmable read-only memory (EEPROM) storing an identification code of the memory module;
the memory driver accesses the EEPROM through a bus driver to read the identification code from the EEPROM; and
through the virtual SPD module, the memory driver accesses the user-programmable memory to acquire the configuration information corresponding to the identification code for the memory module.

12. The computer system with programmable SPD data as claimed in claim 1, wherein:
the user-programmable memory is a special storage medium that is different from a memory in which the system boot code is stored; and
as requested by the memory driver, a driver of the special storage medium accesses the special storage medium through the virtual SPD module to read the virtual SPD data, and the memory driver thereby obtains the configuration information of the memory module.

13. The computer system with programmable SPD data as claimed in claim 11, wherein:
a transfer rate of a bus coupled to the user-programmable memory is higher than a transfer rate of a bus coupled to the EEPROM.

14. The computer system with programmable SPD data as claimed in claim 11, wherein:
the user-programmable memory is accessed through a serial peripheral interface bus; and
the EEPROM is accessed through a system management (SM) bus.

15. The computer system with programmable SPD data as claimed in claim 11, wherein:
the bus driver, the virtual SPD module and the memory driver are all coded in the system boot code.

16. The computer system with programmable SPD data as claimed in claim 12, wherein:
the special storage medium is a USB flash drive or a hard disk.

17. A control method for a memory module, comprising:
storing virtual SPD data in a user-programmable memory, wherein the virtual SPD data includes the configuration information of the memory module, and the virtual SPD data is stored separated from the system boot code of the computer system; and
using a computing unit to execute a memory driver to drive the memory module, wherein the memory driver accesses the user-programmable memory through a virtual SPD module to acquire the configuration information of the memory module,
wherein the virtual SPD module uses a memory mapping input/output technique to get an address, and reads the user-programmable memory to acquire the virtual SPD data that is stored at the address.

18. The control method for a memory module as claimed in claim 17, further comprising:
using an electrically-erasable programmable read-only memory (EEPROM) on the memory module to store the identification code of the memory module;
executing the memory driver to access the EEPROM through a bus driver to read the identification code from the EEPROM; and
executing the memory driver to use the virtual SPD module to access the user-programmable memory, and the configuration information of the memory module corresponding to the identification code is thereby acquired.

* * * * *